United States Patent [19]
Chen et al.

[11] Patent Number: 5,923,886
[45] Date of Patent: Jul. 13, 1999

[54] AUTOMATIC MEMORY SPACE SWITCHING METHOD

[75] Inventors: Kun-Huei Chen; Po-Cheng Yen, both of Taipei, Taiwan

[73] Assignee: Inventec Corporation, Taipei, Taiwan

[21] Appl. No.: 08/942,919

[22] Filed: Oct. 2, 1997

[30] Foreign Application Priority Data

Jan. 4, 1997 [TW] Taiwan ................................. 86104167

[51] Int. Cl.$^6$ ........................................................ G06F 9/06
[52] U.S. Cl. ................................ 395/712; 711/1; 711/102; 711/154
[58] Field of Search ....................................... 395/712, 652, 395/653, 651; 711/154, 157, 159, 100, 102, 1, 147, 163, 167; 713/1, 2, 100

[56] References Cited

U.S. PATENT DOCUMENTS

| | | | |
|---|---|---|---|
| 4,445,204 | 4/1984 | Nishiguchi | 365/194 |
| 5,522,076 | 5/1996 | Dewa et al. | 395/700 |
| 5,555,418 | 9/1996 | Nilsson et al. | 395/712 |
| 5,664,194 | 9/1997 | Paulsen | 395/712 |
| 5,732,275 | 3/1998 | Kullick et al. | 395/712 |
| 5,764,992 | 6/1998 | Kullick et al. | 395/712 |

*Primary Examiner*—Tariq R. Hafiz
*Assistant Examiner*—Tuan Q. Dam
*Attorney, Agent, or Firm*—Bacon & Thomas, PLLC

[57] ABSTRACT

An automatic memory space switching method including the step of enabling a CPU of an electronic apparatus to run a BIOS of a ROM when started, the step of enabling the ROM to provide a control signal to the CPU, causing it to detect an updated version of software program in memory ICs, the step of enabling the CPU to control a switch controller and a common selector in switching a CSROM thereof to the memory IC which is stored with the updated version of software program when the CPU detects the existence of an updated version of software program in one memory IC, the step of enabling the CPU to run the detected updated version of software program and then to continuously run a posterior software program stored in the ROM, and the step of enabling the CPU to run the software program stored in the ROM without making a switching operation when the CPU detects no updated version of software program in the memory ICs.

2 Claims, 4 Drawing Sheets

AUTOMATIC MEMORY SPACE SWITCHING METHOD

BACKGROUND OF THE INVENTION

The present invention relates to an automatic memory space switching method, and more particularly to such a method which automatically detects the existence of an updated version of software program in a memory IC and then runs the updated version of software program when it is available.

In a regular electronic apparatus for example a PDA, the software program is programmed in a mask ROM 82 (see FIG. 4). However, when to update the version of the software program, the whole mask ROM 82 must be replaced. Because the mask ROM 82 is expensive, it is not practical to frequently replace the mask ROM 82. In order to eliminate this problem, a socket and a memory IC 83 are installed for storing an updated version of software program. When a memory IC 83 is used, a manual switch 84 must be installed so that the CSROM 811 of the CPU 81 can be switched between the mask ROM 82 and the memory IC 83. If the switch 84 is not properly switched to the correct position, the CPU 81 cannot run the updated version of software program, and an error operation of the switch 84 may cause the electronic apparatus to shut off.

SUMMARY OF THE INVENTION

The present invention has been accomplished to provide an automatic memory space switching method which eliminates the aforesaid problems. An electronic apparatus according to the present invention comprises a CPU, a ROM, and a plurality of memory ICs for storing an updated version of software program. The chip selection pins of the CPU are respectively connected to the ROM and the memory ICs through a switch controller and a common selector. When the CPU is started, it runs the BIOS of the software program stored in the ROM. At this stage, the ROM gives a control signal to the CPU, causing it to detect the memory ICs. If an updated version of software program is detected stored in one memory IC, the CPU immediately controls the switch controller and the common selector to switch the chip selection pins of the CPU from the ROM to the detected memory IC, and then runs the detected updated version of software program. By means of the arrangement of the present invention, the CPU automatically detects the existence of an updated version of software program in the memory ICs and then runs the detected updated version of software program without through a manual switching operation.

DETAILED DESCRIPTION OF THE PREFERRED EMBODIMENT

Figure 1:
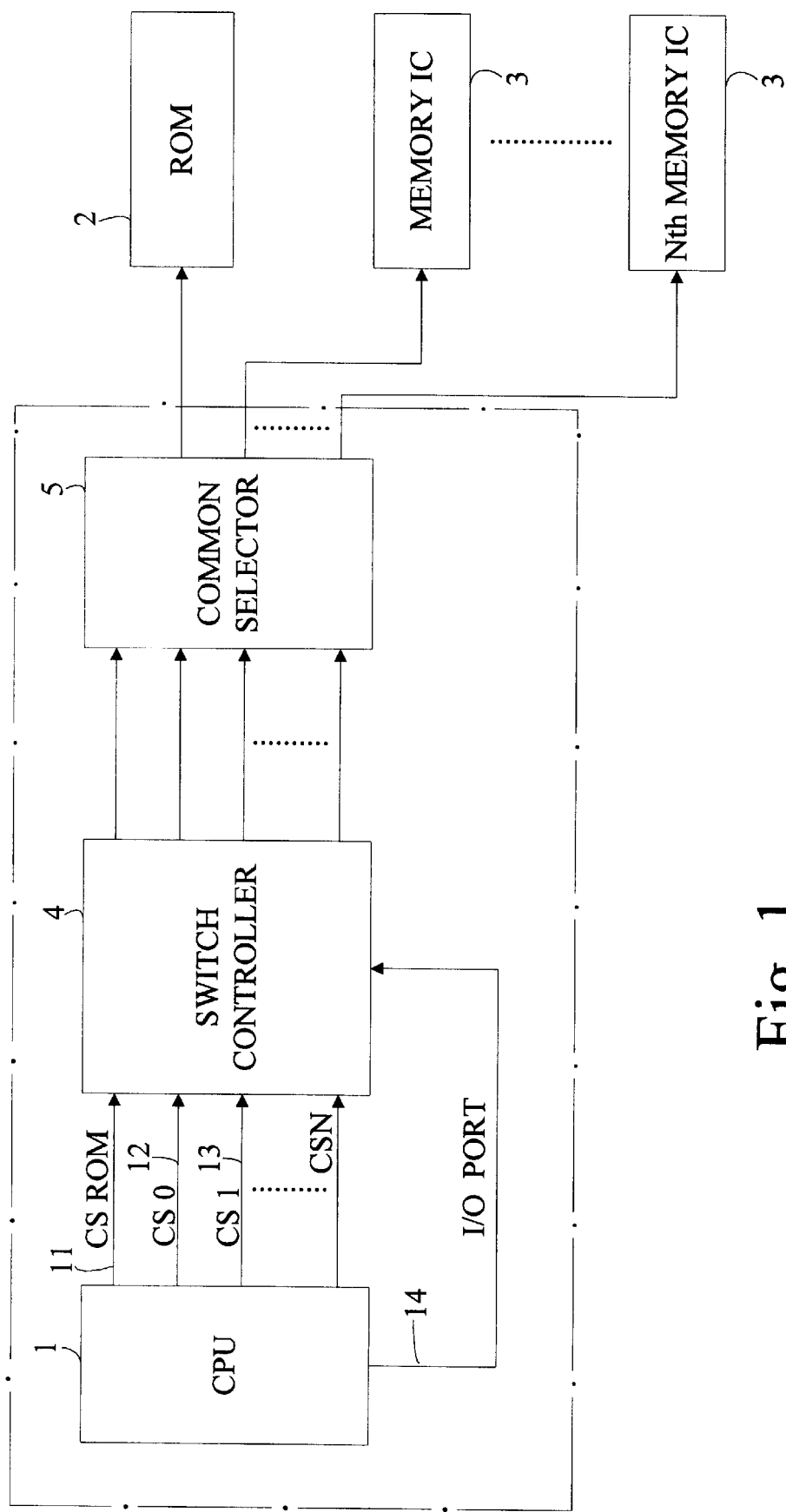
FIG. 1 is a system block diagram according to the present invention.

Referring to FIG. 1, an electronic apparatus used in accordance with the present invention can be a PDA which comprises a CPU (central processing unit)1. The CPU 1 comprises a CSROM (chip selection ROM pin) 11, a plurality of CSNs (chip selection pins) CS0 12;CSI 13; . . . CSN. The PDA further comprises a ROM (read only memory) 2, a plurality of memory ICs 3 stored with updated version of software programs, a switch controller 4, and a common selector 5. When the switch controller 4 does no work, the CSROM 11 and the CSNs (CS0)12;(CS1)13;(. . . CSN) are respectively connected to respective input terminals of the switch controller 4, output terminals of the switch controller 4 are respectively connected to respective input terminals of the common selector 5, output terminals of the common selector 5 are respectively connected to the ROM 2 and the memory ICs 3, and one I/O Port 14 of the CPU 1 is connected to the switch controller 4.

Figure 2:
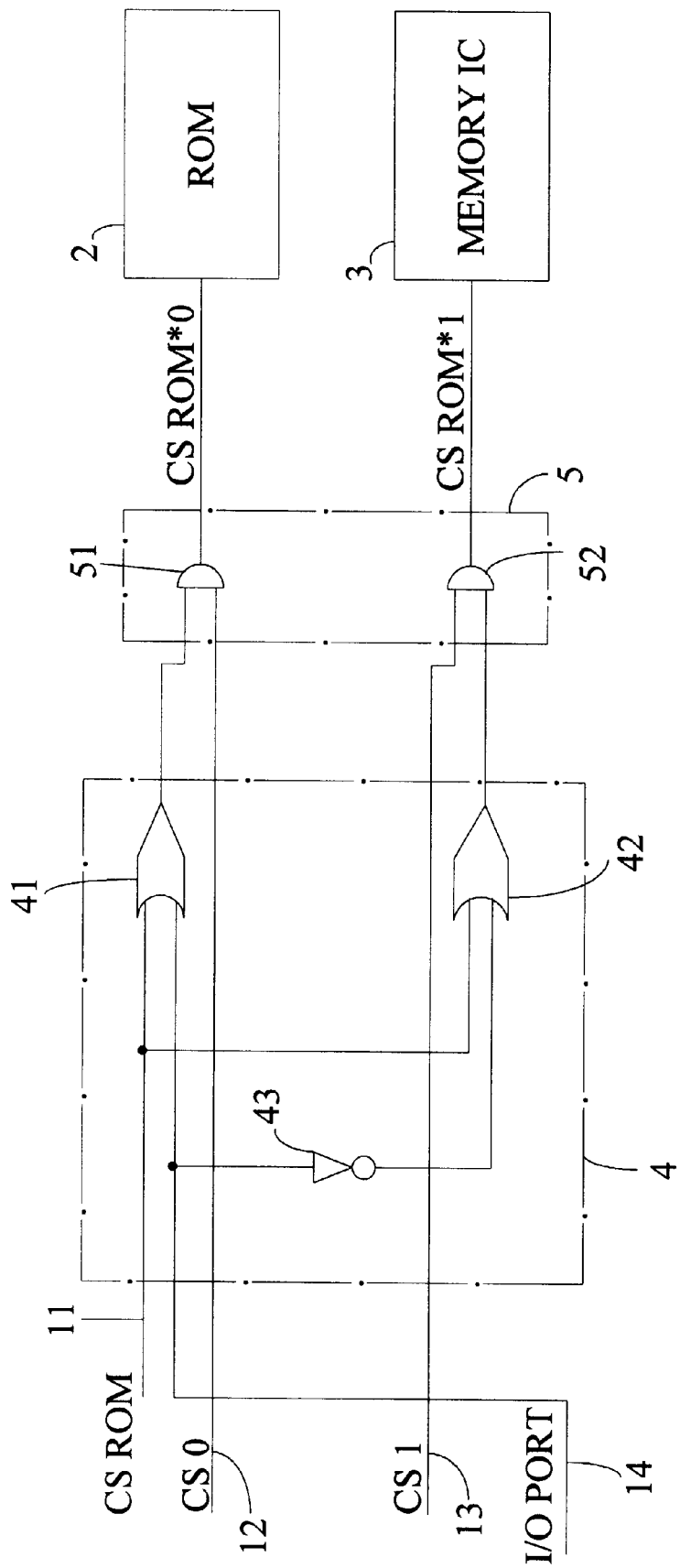
FIG. 2 is a circuit diagram of a part of FIG. 1.

FIG. 2 is a circuit diagram of an embodiment of the present invention in which only one memory IC 3 is installed. As illustrated, the switch controller 4 comprises two OR Gates 41;42. The OR Gates 41;42 have a respective pair of output terminals respectively connected to the CSROM 11 and the I/O port 14 (of the CPU 1; see also FIG. 1). A NOT gate 43 is mounted in a circuit connected between the second OR Gate 42 and the I/O port 14. The common selector 5 comprises two AND Gates 51;52. The first AND Gate 51 has two input terminals respectively connected to the first OR Gate 41 and the CS0 12, and an output terminal connected to the ROM 2. The second AND Gate 52 has two input terminals respectively connected to the second OR Gate 42 and the CS1 13, and an output terminal connected to the memory IC 3. When the I/O Port 14 provides a low potential output signal 0, it means that no updated version of software program is installed. Under this stage, the CSROM 11 and the CS0 12 read in a software program from the ROM 2 through the first AND Gate 51 of the common selector 5, and then run the fetched software program. When the I/O Port 14 provides a high potential output signal 1, it means that there is an updated version of software program installed. Under this stage, the CSROM 11 and the CS 1 13 read in an updated version of software program from the memory IC 3 through the second AND Gate 52 of the common selector 5, and then run the fetched updated version of software program.

Figure 3:
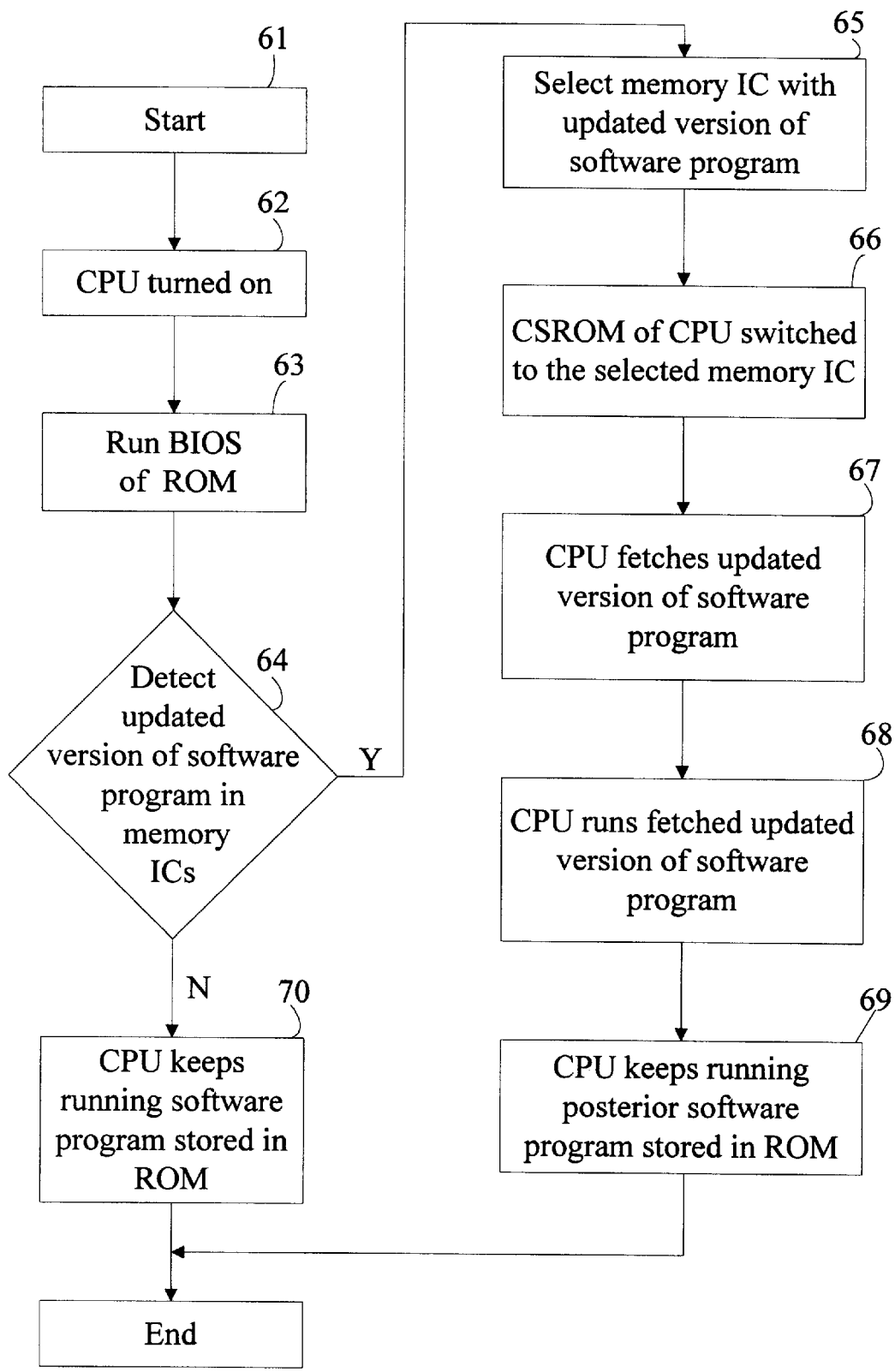
FIG. 3 is a flow chart according to the present invention.
Figure 4:
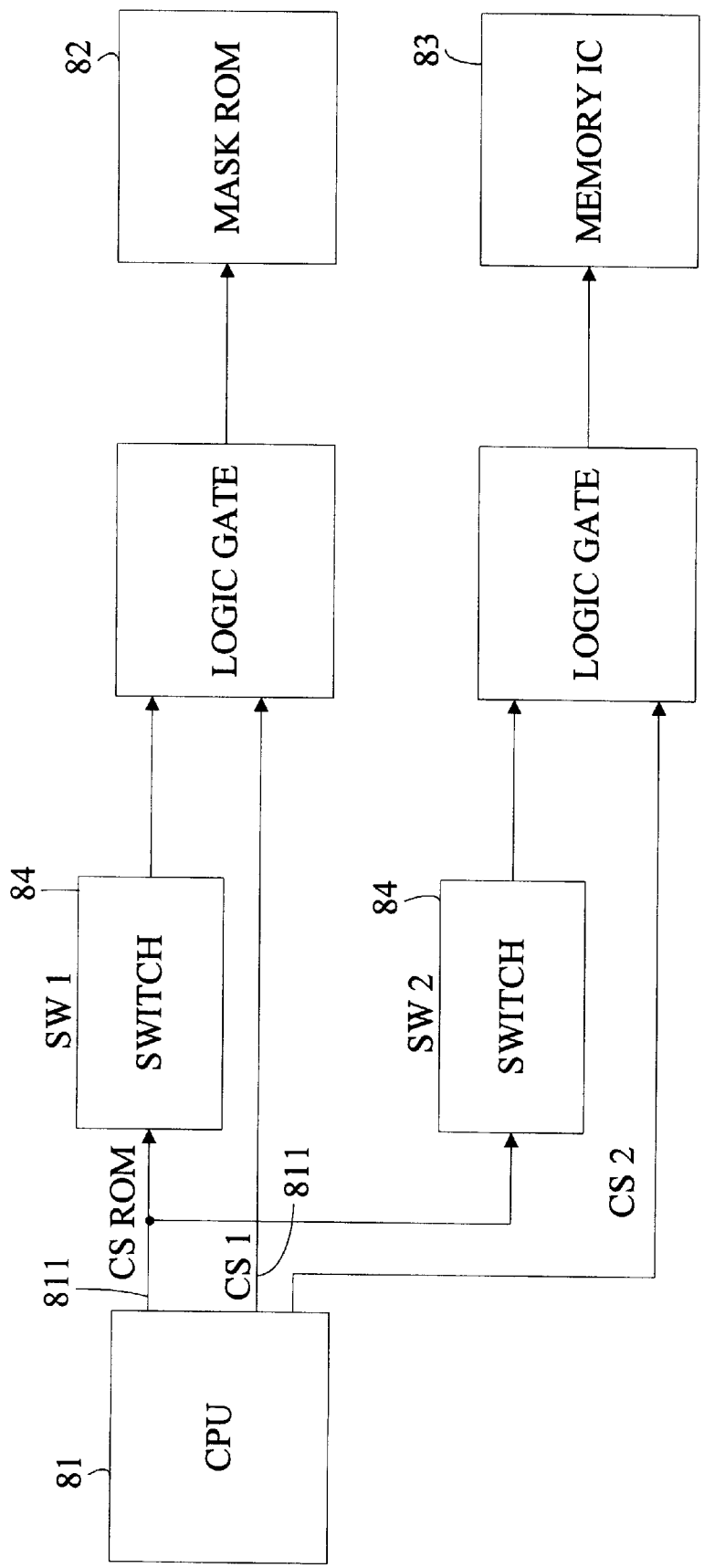
FIG. 4 is a system block diagram according to the prior art.

Referring to FIG. 3, when the PDA is started (step 61), the CPU 1 is started (step 62) to run the BIOS (basic input/output system) of the ROM 2 (step 63). At this stage, the ROM 2 gives a control signal to the CPU 1, causing it to detect the existence of an updated version of software program in the memory ICs 3 (step 64). When an updated version of software program is detected in one memory IC 3, the memory IC 3 which is stored with the updated version of software program is selected (step 65),then the I/O Port 14 outputs a control signal to the switch controller 4 and the common selector 5, causing the CSROM 11 to be switched to the selected memory IC 3 (step 66). After switching, the CPU 1 fetches the updated version of software program from the selected memory IC 3 (step 67), and then runs the BIOS of the fetched software program (step 68), and then keeps running the posterior software program stored in the ROM 2 (step 69). If the CPU 1 detects no updated version of software program, it immediately runs the posterior software program stored in the ROM 2 without making a switching operation (step 70).

As indicated above, the present invention automatically detects the existence of an updated version of software program in the memory IC 3, and then selects the ROM 2 or the memory IC 3 as the start position for initiating a software program. This method eliminates the action of manually switching the selector switch, and saves much operation time.

It is to be understood that the drawings are designed for purposes of illustration only, and are not intended as a definition of the limits and scope of the invention disclosed.

What the invention claimed is:

1. An automatic memory space switching method comprising the steps of:

(a) starting a CPU (central processing unit) of an electronic apparatus to run a BIOS (basic input/output system) of a ROM (read only memory);

(b) enabling the ROM to provide a control signal to the CPU, causing it to detect an updated version of software program in memory ICs;

(c) enabling the CPU to control a switch controller and a common selector in switching a CSROM (chip selection ROM pin) thereof to the memory IC which is stored with the updated version of software program when the CPU detects the existence of an updated version of software program in one memory IC, then enabling the CPU to run the detected updated version of software program and then to continuously run a posterior software program stored in the ROM; and (d) enabling the CPU to run the software program stored in the ROM without making a switching operation when the CPU detects no updated version of software program in the memory ICs.

2. The automatic memory space switching method of claim 1, wherein said switch controller comprises a first OR Gate connected to the CSROM of the CPU and an I/O Port thereof, a plurality of second OR Gate respectively connected to the CSROM and I/O Port of the CPU, and a NOT Gate respectively connected mounted in the circuit connected between the I/O Port of the CPU and each of the second OR Gates; the common selector comprises a first AND Gate and a plurality of second AND Gates, the first AND Gate having input terminals respectively connected to the first OR Gate and one chip selection pin of the CSROM and an output terminal connected to the ROM, each of the second AND Gates having input terminals respectively connected to the second OR Gate and one chip selection pin of the CSROM and an output terminal connected to one memory IC.

* * * * *